US012169187B2

(12) United States Patent
Piras et al.

(10) Patent No.: US 12,169,187 B2
(45) Date of Patent: Dec. 17, 2024

(54) METHOD OF AND SYSTEM FOR PERFORMING SUBSURFACE IMAGING USING VIBRATION SENSING

(71) Applicant: Nederlandse Organisatie voor toegepast-natuurwetenschappelijk onderzoek TNO, s-Gravenhage (NL)

(72) Inventors: Daniele Piras, Amsterdam (NL); Paul Louis Maria Joseph van Neer, Bergschenhoek (NL); Maarten Hubertus van Es, Voorschoten (NL); Hamed Sadeghian Marnani, Nootdorp (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 498 days.

(21) Appl. No.: 16/477,479

(22) PCT Filed: Jan. 11, 2018

(86) PCT No.: PCT/NL2018/050018
§ 371 (c)(1),
(2) Date: Jul. 11, 2019

(87) PCT Pub. No.: WO2018/132003
PCT Pub. Date: Jul. 19, 2018

(65) Prior Publication Data
US 2020/0124571 A1    Apr. 23, 2020

(30) Foreign Application Priority Data

Jan. 13, 2017  (EP) ..................................... 17151437

(51) Int. Cl.
G01N 29/06    (2006.01)
G01N 29/24    (2006.01)
(Continued)

(52) U.S. Cl.
CPC ..... *G01N 29/0654* (2013.01); *G01N 29/2437* (2013.01); *G01N 29/26* (2013.01);
(Continued)

(58) Field of Classification Search
CPC ........... G01N 29/0654; G01N 29/2437; G01N 29/26; G01N 29/069; G01N 29/2418;
(Continued)

(56) References Cited

U.S. PATENT DOCUMENTS 4,710,030 A * 12/1987 Tauc .................. G01N 21/1702
356/432
5,319,977 A * 6/1994 Quate .................... G01Q 60/32
73/620
(Continued)

FOREIGN PATENT DOCUMENTS

CN        104535172 A  *  4/2015
WO   WO-2006001842 A2  *  1/2006  ......... G01N 21/1702
WO   WO-2016054067 A1  *  4/2016  ............. G01N 29/04

OTHER PUBLICATIONS

Kwak et al., "Visualization of Interior Structures with Nanoscale Resolution Using Ultrasonic-Atomic Force Microscopy," Proc. of SPIE, vol. 8691, pp. 869117-1 to 869117-9 (2013).
(Continued)

*Primary Examiner* — Peter J Macchiarolo
*Assistant Examiner* — Monica S Young
(74) *Attorney, Agent, or Firm* — Leydig, Voit & Mayer, Ltd.

(57) ABSTRACT

The present invention relates to a method of performing subsurface imaging of embedded structures in a substrate underneath a substrate surface, the method comprising the steps of applying, using a signal application actuator, an acoustic input signal to the substrate, detecting, using a vibration sensor, a return signal from the substrate and
(Continued)

analyzing the return signal for obtaining information on the embedded structures, for enabling imaging thereof wherein the step of applying the acoustic input signal comprises applying a discontinuous signal of an acoustic signal component to the substrate, the acoustic signal component having a frequency above 1 gigahertz, such that the return signal includes a scattered fraction of the discontinuous signal scattered from the embedded structures. The invention further relates to a system.

19 Claims, 7 Drawing Sheets

(51) Int. Cl.
*G01N 29/26* (2006.01)
*G01Q 60/32* (2010.01)
*G01S 7/527* (2006.01)
*G01S 15/04* (2006.01)
*G01S 15/89* (2006.01)

(52) U.S. Cl.
CPC .............. *G01S 7/527* (2013.01); *G01S 15/04* (2013.01); *G01S 15/89* (2013.01); *G01Q 60/32* (2013.01)

(58) Field of Classification Search
CPC ...................... G01N 29/343; G01N 2291/044; G01S 7/527; G01S 15/04; G01S 15/89; G01Q 60/32
USPC .......................................................... 73/570
See application file for complete search history.

(56) References Cited

U.S. PATENT DOCUMENTS

| | | | | |
|---|---|---|---|---|
| 8,914,911 | B2* | 12/2014 | King | G01Q 60/58 850/25 |
| 9,134,341 | B2* | 9/2015 | Prater | G01N 21/171 |
| 2005/0028594 | A1* | 2/2005 | Chen | G01N 29/223 73/627 |
| 2007/0273952 | A1* | 11/2007 | Murray | G01B 11/0666 359/238 |
| 2008/0276695 | A1* | 11/2008 | Prater | G01N 29/0681 73/105 |
| 2008/0295584 | A1* | 12/2008 | Cantrell | G01Q 60/32 73/105 |
| 2011/0036170 | A1* | 2/2011 | Shekhawat | G01N 29/0663 73/603 |
| 2017/0221778 | A1* | 8/2017 | Mehendale | G01N 29/2418 |
| 2018/0299770 | A1* | 10/2018 | Ten Berge | G03F 1/72 |

OTHER PUBLICATIONS

Hu et al., "Imaging of Subsurface Structures Using Atomic Force Acoustic Microscopy at GHz Frequencies," Journal of Applied Physics 109, pp. 084324-1 to 084324-6 (2011).

Strohm et al., "High Resolution Ultrasound and Photoacoustic Imaging of Single Cells," Photoacoustics 4, pp. 36-42 (2016).

Chinn et al., "Acoustic Characterization of Mesoscale Objects," Lawrence Livermore National Laboratory, FY06 LDRD Final Report, UCRL-TR-229835, pp. 1-28 (Apr. 10, 2007).

Saito et al., "Imaging Gigahertz Surface Acoustic Waves Through the Photoelastic Effect," Journal of the Optical Society of America B: Optical Physics, 27(12): pp. 2632-2638 (Dec. 1, 2010).

Chen et al., "Controlling Gigahertz and Terahertz Surface Electromagnetic Waves with Metamaterials Resonators," Physical Review X 1, 021016-1 to 021016-6 (2011).

Thorsten Hesjedal, "Surface Acoustic Wave-Assisted Scanning Probe Microscopy—A Summary," Reports on Progress in Physics 73, 016102, pp. 1-42 (2010).

Matsuda et al., "Fundamentals of Picosecond Laser Ultrasonics," Ultrasonics 56, pp. 3-20 (2015).

European Patent Office, International Search Report in corresponding International Application No. PCT/NL2018/050018, dated Jun. 22, 2018 (4 pages).

* cited by examiner

METHOD OF AND SYSTEM FOR PERFORMING SUBSURFACE IMAGING USING VIBRATION SENSING

FIELD OF THE INVENTION

The present invention is directed at a method of performing subsurface imaging of embedded structures in a substrate underneath a substrate surface, the method comprising the steps of: applying, using a signal application actuator, an acoustic input signal to the substrate; detecting, using a vibration sensor, a return signal from the substrate; and analyzing the return signal for obtaining information on the embedded structures, for enabling the imaging thereof.

The invention is further directed at a system for performing subsurface imaging of embedded structures in a substrate underneath a substrate surface, the system comprising a signal application actuator for applying an acoustic input signal to the substrate, a vibration sensor for detecting a return signal from the substrate, and an analyzer for analyzing the return signal, for obtaining information on the embedded structures for enabling imaging thereof.

BACKGROUND

Developments in the semiconductor industry are typically governed by Moore's law which predicts that the number of transistors in a dense integrated circuit doubles every two years. As will be appreciated, this poses significant technological challenges whenever technological boundaries constituted by physical laws are encountered and need to be overcome to meet the industry demands for even smaller and smaller integrated circuits.

A new type of structures that is presently on the rise are the three dimensional NAND or 3D NAND type memory structures. The term NAND, in this context, is not an abbreviation or acronym, but refers to the logical operation NAND or in other words NOT(AND(..,..)). 3D NAND devices consist of hundreds of stacked device layers having a total thickness of a few micrometers. In order to enable monitoring and inspection of alignment, overlay and/or product metrology during and after manufacturing of such devices, a subsurface imaging technology is to be applied that allows to visualize nanometer structures buried deeply (several micrometers) below the surface of the device.

Acoustic type atomic force microscopy (AFM) has been proposed as a suitable technology to perform subsurface imaging on semiconductor structures. These methods typically apply an ultrasound signal to a sample or sometimes to the probe, while scanning the sample in contact mode (ultrasonic atomic force microscopy (UAFM)). As a result of the applied ultrasound signal, the interaction between the probe and the surface contains a component that is dependent on the elastic properties of the sample. Due to the fact that buried structures underneath a sample alter the local contact elasticity between the probe tip and the surface, the application of the ultrasound signal and proper analysis of the probes deflection (i.e. via the output signal) allows to visualize subsurface structures. In particular, the detection of subsurface structures by means of ultrasonic AFM is based on resonance frequency shifts of a cantilever that are due to contact stiffness changes. Such resonance shift is detected by measuring the amplitude or phase change at a single frequency.

A disadvantage of the abovementioned ultrasonic atomic force microscopy methods for subsurface imaging, is that although they work well at shallow depths underneath the surface (up to about 0.2 micrometer ($\mu$m)), they do not allow detection of structures at greater depths. Thus, this does not allow the visualization of deeply buried features in larger semiconductor devices, such as the abovementioned 3D NAND devices.

SUMMARY OF THE INVENTION

It is an object of the present invention to provide a subsurface imaging method for imaging of embedded structures in a substrate underneath a substrate surface, which is suitable for visualization of deep subsurface layers up to few micrometers deep.

To this end, in accordance with a first aspect, there is provided herewith a method of performing subsurface imaging of embedded structures in a substrate underneath a substrate surface, the method comprising the steps of: applying, using a signal application actuator, an acoustic input signal to the substrate; detecting, using an vibration sensor, a return signal from the substrate; and analyzing the return signal for obtaining information on the embedded structures, for enabling imaging thereof; wherein the step of applying the acoustic input signal comprises applying a discontinuous signal of an acoustic signal component to the substrate, the acoustic signal component having a frequency above 1 gigahertz, such that the return signal includes a scattered fraction of the discontinuous signal scattered from the embedded structures. At the above frequencies, the subsurface imaging method of the present invention is primarily based on scattering of the discontinuous acoustic signal at structures underneath the surface. Instead of the earlier described elastic interaction, scattering of the applied signal allows visualization of structures at much greater depths in the substrate. Compared to the earlier described conventional ultrasonic AFM (UAFM), the conventional UAFM methods study the subsurface structures in the sample only through elastic deformation (i.e. the elastic stress field), whereas the method of the present invention sends an acoustic signal into the sample and studies the echo (return signal including scattered fraction) thereof. It has been found that the present method is particularly suitable to study subsurface structures in multilayer semiconductor devices, in particular thicker semiconductor devices. The invention is described with the acoustic signal component having a frequency above 1 GHz. It is observed however that, using scattering as the mechanism for detection, the wavelength of the signal in the material of the sample determines the smallest dimension that may still be detected. Therefore, the frequency range of the acoustic signal component may also be any of above 1.5 GHz, above 2 GHz, above 2.5 GHz, above 3 GHz, above 10 GHz or above 50 GHz, dependent on the application.

As a result, although the method may advantageously be applied using a specialized AFM system, the application of the acoustic input signal and the reception of the return signal does not necessarily have to be performed using an AFM signal. The invention, as will become apparent, foresees in the method being applied in various different manners. Some of the implementations use an AFM system, and some implementations apply optical stimulation of the sample and/or optical sensing of the return signal. Other implementations are based on combinations of AFM based methods and optical methods.

Preferably, in accordance with some embodiments, the discontinuous signal applied is a pulse signal. The pulse signal or pulse train applied must be short enough to ensure that the forward and backward propagation of the discontinuous signal in the sample do not mix. A continuous wave excitation would in fact lead to a strongly non-uniform sample surface displacement, making the interpretation of the images significantly more complex than in the case of pulsed excitation. Ultimately, pulse signals having a duration longer than the acoustic travel time through the sample are to be avoided. A discontinuous and short pulse prevents transducer overheating and subsequent thermal damages at higher operation voltages compared to continuous wave excitation. When the duration becomes too long, this will go at the cost of depth resolution, resulting in poor detection. The spatial pulse length may thus be dependent on the material (as the sound velocity for different materials is different), and may be shorter for softer materials while being longer for harder materials. In some embodiments, the discontinuous signal has a signal time duration shorter than the acoustic travel time to the desired depth of detection. For example, for a depth of 300 micrometer in a sample made primarily of a material having a sound velocity of 5000 meters per second, the pulse duration preferably does not exceed $(300*10^{-6})/5000=6*10^{-8}$ sec (60 nanoseconds). It is further noted that, if not only the presence of a subsurface feature is to be detected, but it is also desired to measure it's thickness, then the pulse duration must be smaller than the expected travel time through the subsurface feature.

In accordance with a second aspect, there is provided a system for performing subsurface imaging of embedded structures in a substrate underneath a substrate surface, the system comprising a signal application actuator for applying an acoustic input signal to the substrate, a vibration sensor for detecting a return signal from the substrate, and an analyzer for analyzing the return signal, for obtaining information on the embedded structures for enabling imaging thereof, wherein the signal application actuator is configured for providing a discontinuous signal of an acoustic signal component, wherein the acoustic signal component has a frequency above 1 gigahertz, and for applying the discontinuous signal to the substrate. As referred to above, the invention is described with the acoustic signal component having a frequency above 1 GHz. It is observed however that, using scattering as the mechanism for detection, the wavelength of the signal in the material of the sample determines the smallest dimension that may still be detected. Therefore, the frequency range of the acoustic signal component may also be any of above 1.5 GHz, above 2 GHz, above 2.5 GHz, above 3 GHz, above 10 GHz or above 50 GHz, dependent on the application.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
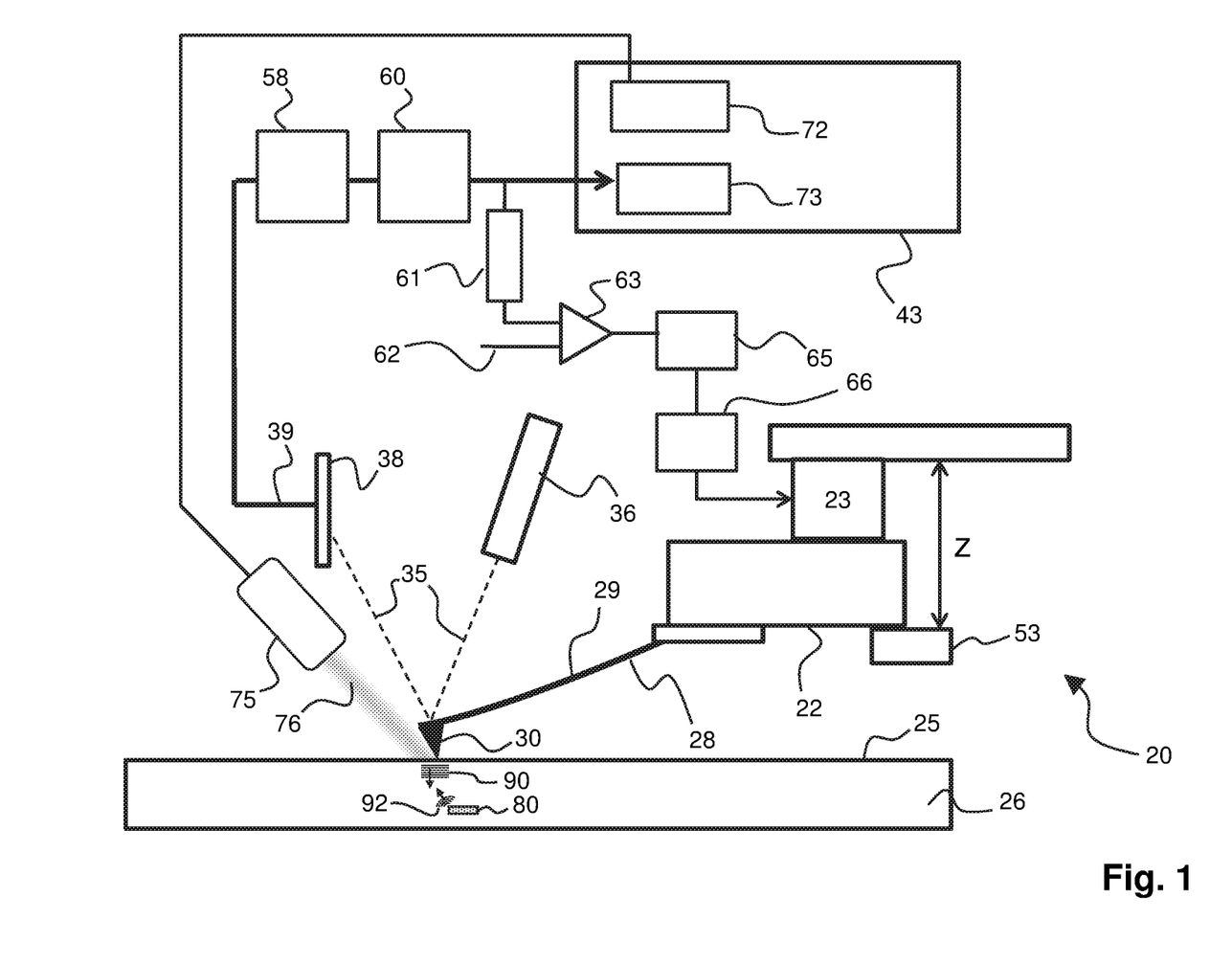
FIG. 1 schematically illustrates a system in accordance with the present invention.

FIG. 1 schematically illustrates a measurement system 20 in accordance with an embodiment of the invention. The system 20 may be applied for performing a method in accordance with the present invention, for example the method in accordance with the embodiment illustrated in FIG. 3 amongst others. In the system 20, a probe 28 is attached to a scan head 22. The scan head 22 enables scanning of the probe 28 relative to the surface 25 of a sample 26. The probe 28 consists of a cantilever 29 and a probe tip 30. During scanning, the probe tip 30 is brought in contact with the surface 25 of the sample 26. For example the probe tip 30 may be scanned across the surface 25 of the sample 26 in contact mode (continuous contact between the probe tip 30 and the surface 25 of the sample 26). A laser unit 36 provides a collimated laser beam 35 that impinges on the cantilever 29 and reflects towards an optical detector 38 (e.g. photo diode). Using the optical detector 38, vibrations in the cantilever 29 can be sensed due to small deflections of the reflected beam 35 under influence of such vibrations. This provides an output signal 39 for further analysis. As may be appreciated, although in FIG. 1 a single scan head 22 is depicted, the method may equally be applied in systems including multiple scan heads.

Figure 3:
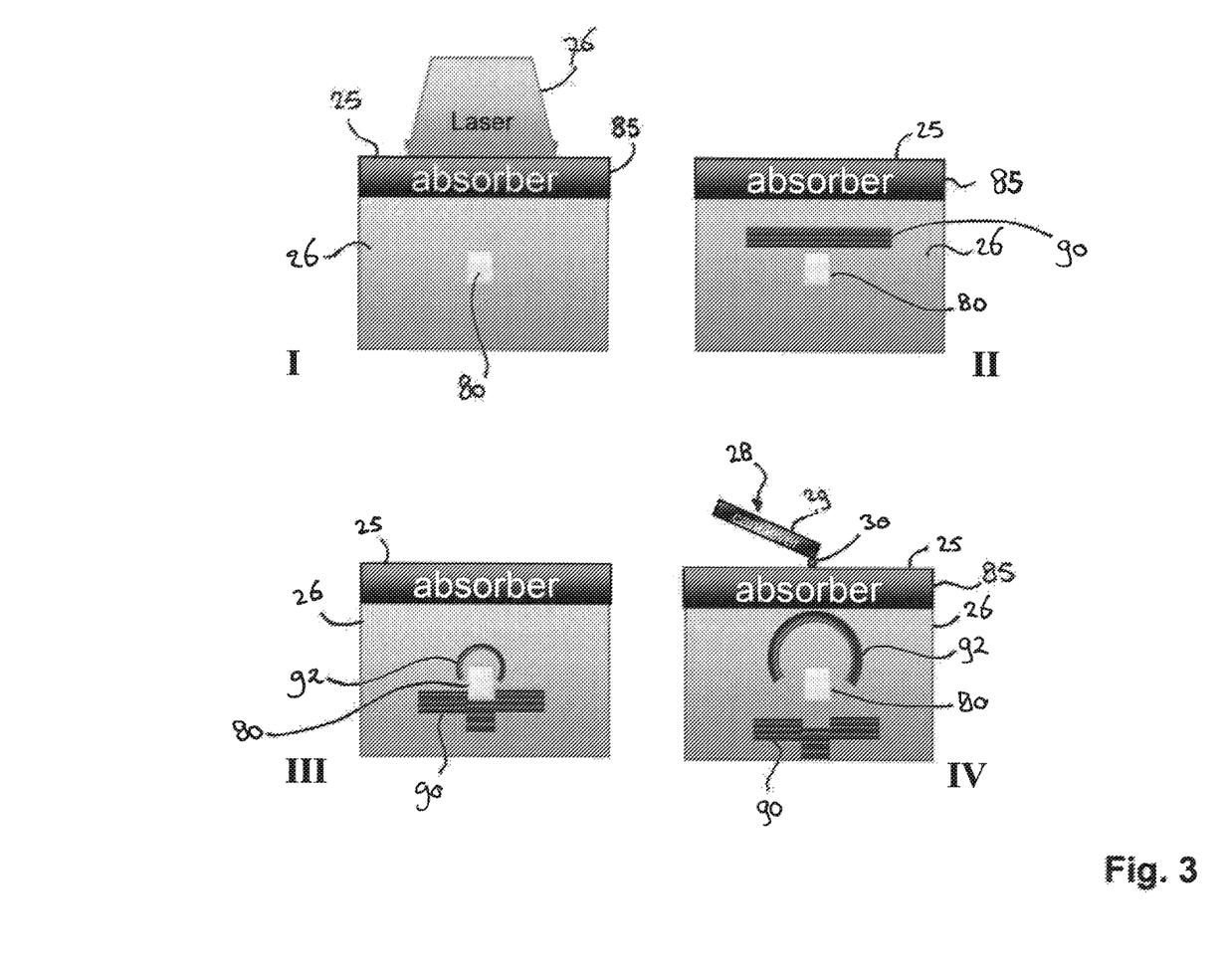
FIG. 3 schematically illustrates a method in accordance with an embodiment of the present invention.

The present system enables to apply a very high frequency acoustic input signal 90 (e.g. see FIG. 3) of limited time duration, i.e. a discontinuous input signal, to the sample 26. In system 20, a generator 72 generates a control signal of time limited duration that is provided to a pulsed laser 75, such as a femtosecond pulsed laser. The pulsed laser 75 generates an optical signal—laser beam 76—having a duration (e.g. 100 femtoseconds (fs)) in accordance with that of the control signal received from generator 72. An absorption layer 85 (not shown in FIG. 1, see e.g. FIG. 3) is present on the surface 25 of the sample 26. The absorption layer 85 is made of a material having an optical absorption coefficient that is tuned with the wavelength of the optical radiation of pulsed laser beam 76. Thus, the absorption layer 85 and the wavelength of laser 75 are chosen to match this requirement. The laser beam 76 is made to impinge on absorption layer 85, as illustrated in FIG. 1. The absorption layer 85 has a carefully selected thickness, which is selected dependent on the sound velocity and the optical absorption of the material of which absorption layer 85 is made. Because laser beam 76 is a pulsed laser beam, thermal expansion and relaxation of the absorption layer causes the layer to resonate at a frequency equal to:

generated frequency=(sample speed of sound)/
(2π·sample optical thickness)

Thus, impinging the laser beam 76 on the surface 25 of the sample 26, causes the absorption layer 85 to start vibrating at the above generated frequency. The velocity of sound in the absorption layer 85 is largely dependent on the material, and likewise, so will the preferred thickness of the layer 85 be dependent on this sound velocity in relation to the desired frequency of the acoustic input signal. To provide at least one example, if the velocity of sound of the material is 10000 meters per second (m/s) and the desired frequency is 1 gigahertz (1 GHz=$10^9$ hertz (Hz)), then the thickness of the layer 85 would have to be 1.6 micrometer. The velocity of sound, however, may for different materials easily be anywhere between 2000 m/s and 10000 m/s. Suitable materials for forming the absorption layers may include any one or more of the following materials: Aluminum, Chromium, Tantalum, Tungsten.

The acoustic input signal 90 may be of short duration, e.g. a pulse signal such as a delta pulse. Preferably, pulse signal or pulse train applied must be short enough to ensure that forward and backward propagation of the discontinuous signal in the sample do not mix. The spatial pulse length may thus be dependent on the material (as the sound velocity for different materials is different) and may be shorter for softer materials while being longer for harder materials. The spatial pulse length may be dependent on the material (as the optical absorption for different material is different) and may be shorter for high optical absorption (more opaque) materials while being longer for low optical absorption (more transparent) materials. In some embodiments, the discontinuous signal has a signal time duration shorter than the intended detection depth divided by the speed of sound in the primary material of the sample.

The acoustic input signal 90 will propagate through the material of sample 26, and any structures 80 or density variations encountered will cause a fraction 92 of the input signal 90 to be scattered back to surface 25. Applying a short duration pulse of laser beam 76 will thus have the effect of sending a short duration discontinuous acoustic input signal 90 into the sample, after which a scattered return signal 92 is received.

The return signal 92 is picked up using the probe 28. The probe tip 30 in contact with surface 25 will receive the induced acoustic vibrations of return signal 92, and proper analysis of output signal 39 allows to isolate the signal components corresponding to the return signal 92. Any sub-surface structures 80 may be visualized by analysis of return signal 92 received via the vibration response of the cantilever 29 and the probe tip 30. This is measured through photo diode 38 and may thus be derived from output signal 39 by analyzing the output signal. This output signal 39 is provided to the analysis system 43. In the analysis system 43, a hardware or software module 73 isolates the scattered fraction 92 from the output signal 39 to provide an image of the subsurface structures 80.

Figure 2:
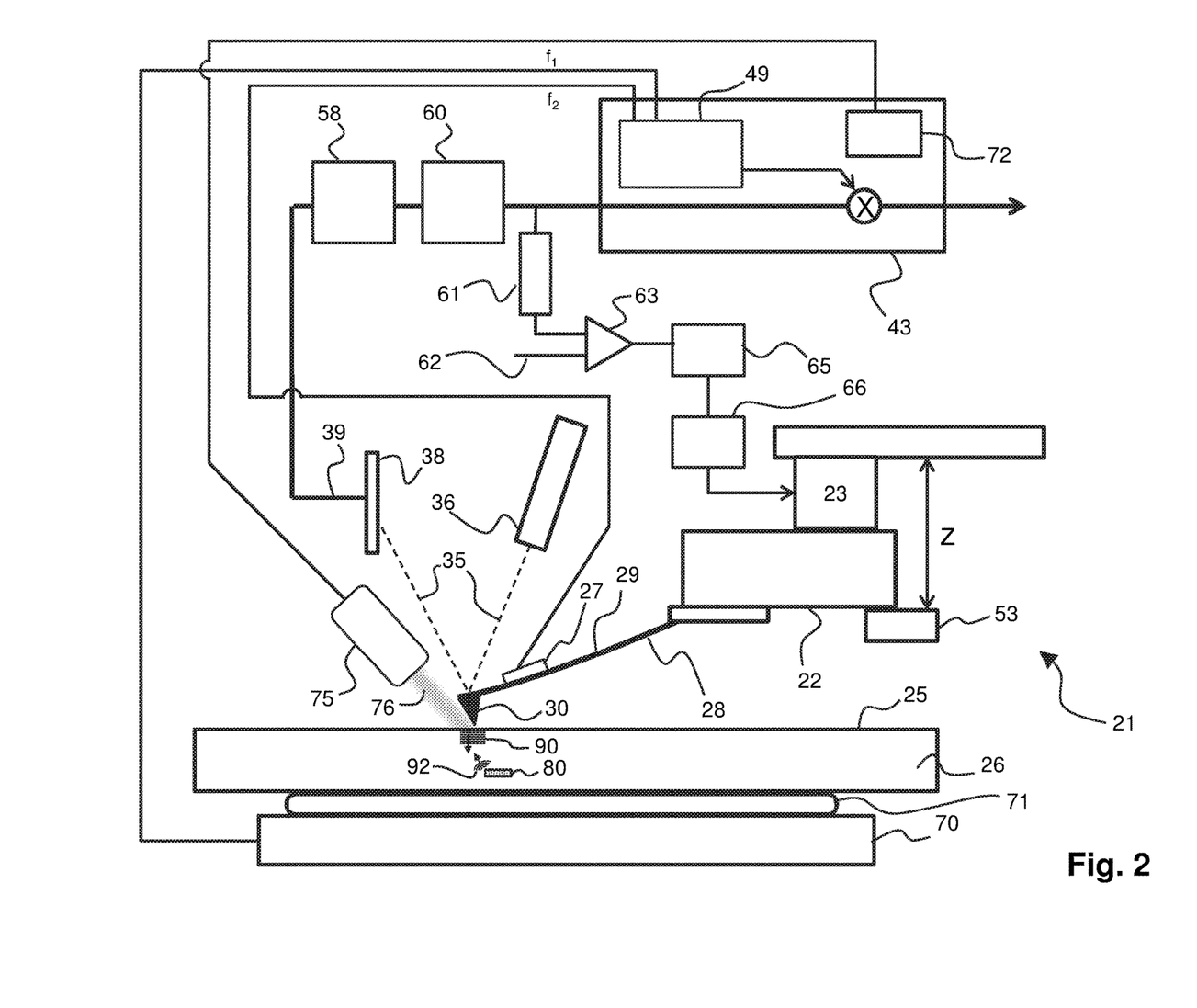
FIG. 2 schematically illustrates a system in accordance with the present invention.

In addition to mapping sub-surface structures, the system 20 may further be arranged for performing regular atomic force microscopy such as to map on-surface structures on the surface 25. In FIGS. 1 and 2, to this end, the output signal 39 after pre-amplification in pre-amplifier 58 and after pre-analysis in analyzer 60, is provided both to the lockin amplifier analysis system 43 and to a low pass filter 61. The low pass filter removes the high frequency components relating to the sub-surface measurements from the output signal and provides the signal to a comparator 63. The comparator compares the output signal with the set-point that is received at input 62 (e.g. from a controller system), and yields a differential signal that is provided to the feedback controller 65. The feedback controller provides a control signal for driving the piezo-electric actuators 23 for adjusting the z-level of the probe 28, i.e. the distance in height of the probe 28 above the surface 25. The corrections, which may be obtained from the feedback controller 65 by analyzing the control signal, may be more accurately determined with z-level sensor 53. The determined z-level corrections are mapped to provide a surface topography map of the surface 25.

FIG. 2 illustrates an alternative system 21 in accordance with a further embodiment of the invention. Many of the parts and elements of system 21 are similar or even may be identical to those of system 20, or provide a same or similar function. Where these elements only provide a same or similar function, these elements could be different from the corresponding elements described above in relation to FIG. 1. For the comprehensibility of the drawings, such elements may have been designated with same or similar reference numerals. At least in those cases where elements have different numbers, such elements may provide a different function in the system.

System 21 further includes a transducer 70 mounted underneath the sample 26, and a further transducer 27 mounted on cantilever 29. The transducers 70 and 27 enable the system 21 to simultaneously apply additional ultrasonic force microscopy (UFM) at lower frequencies. In system 21, simultaneous to the application of the very high frequency acoustic input signal 90 applied to sample 26, the transducer 70 may for example apply a further acoustic input signal at a frequency $f_1$ within a frequency range of 1 to 100 megahertz (MHz). An additional low frequency signal at frequency $f_2$ near the resonance frequency of the cantilever (e.g. between 100 kilohertz (kHz) and 1 MHz; say 550 kHz as an example) is applied via transducer 27 on the cantilever 29. The transducers 70 and 27 may be piezo type transducers or other suitable transducers. The transducer 27 may be mounted on the cantilever 29 as indicated, or on the back side of the probe tip 30 (i.e. above the probe tip 30), or near the mounting of the probe 28 to scan head 22. Any location where vibrations from the transducer 27 may be effectively fed into the probe 28 may be suitable for mounting the transducer 27. The signal at frequency $f_2$ may alternatively even be applied directly to the sample 26, or even via transducer 70. Transducer 70 does not have to be located underneath the sample 26, but may be located on the surface 25 or even on a side of the sample 26. Moreover, both signals from transducers 70 and 27 may be applied by a single transducer, making any or both of these two transducers obsolete in that case. The signals at frequencies $f_1$ and $f_2$ may also both be applied via the transducer 27 on the cantilever 29.

Notwithstanding the abovementioned alternatives, in FIG. 2 the analyzer system 43 of system 21 comprises a signal generator 49 that enables to generate a first ultrasonic input signal 51 including frequency $f_1$ and a second ultrasonic input signal 52 including frequency $f_2$. In FIG. 2, the first ultrasonic input signal 51 of frequency $f_1$ is applied via transducer 70 as an acoustic signal 52 during scanning of the probe 28 across the surface 25. The transducer 27 in contact with the cantilever 29 receives the second ultrasonic input signal 52 including frequency $f_2$. The high frequency ultrasound signal at frequency $f_1$ causes indentation of the probe tip 30 against the surface 25. Tip-sample interaction between the probe tip 30 and the surface 25 causes the resonance frequency of the probe to shift. This is dependent on the local elastic properties of the sample, which in turn depends on the subsurface structure. Hence, structures within the elastic stress field (Hertzian field) can be measured by analysis of the output signal 39 around the resonance frequency (i.e. near $f_2$). The effect may be compared with feeling an object through a pillow, i.e. the changes in the output signal 39 caused by resonance frequency shifts allow to visualize subsurface structures.

As explained above, the penetration depth of the stress field is limited (up to e.g. 150 nanometer below the surface), and deeper structures may be detected using the abovementioned very high frequency discontinuous signal applied to the sample 26. However, the additional information on shallow structures, obtained from the latter type of UFM measurement provides additional information useable to increase accuracy, as well as structural information e.g. of the integrity of various layers within the shallow stress field. In and industrial setting, such additional measurements may be highly valuable in a manufacturing process.

Application of the discontinuous acoustic input signal 90, in accordance with the present invention, is not limited to application via photo-thermal stimulation as achieved above using the pulse laser beam 76 and absorption layer 85. This is just one manner of applying the discontinuous acoustic input signal. In accordance with another embodiment, the discontinuous acoustic input signal may be applied to the sample using a suitable piezo type transducer or an electrostatic actuator. According to some of these embodiments, the transducer or actuator may be mounted to the probe 28, i.e. to either on or both of the cantilever 29 or the probe tip 30. For example, the transducer or actuator may be mounted to the back of the probe tip 30, above the probe tip 30 on the cantilever 29. Alternatively, such a transducer or actuator may be mounted to the back of the sample 26. For example, a transducer or actuator may be arranged on a sample carrier, and coupled to the sample using a coupling medium which is coupling with respect to the acoustic vibrations. A suitable medium may for example be provided by water, a grease or a paste.

As stated hereinbefore, also the sensing of the return signal 92 may be performed in various different manners as well. In some embodiments, this signal may be obtained using the probe 28, by scanning the probe tip 30 across the surface 25 in contact mode. The output signal 39 is obtained using a laser beam 35 specular reflected off the back of the probe tip 30 or the cantilever 29, and incident onto a photo diode 38, e.g. a quadrant type photo diode. Alternatively, a photo-thermal acoustic probing technique may be applied. For example, a probe beam may be used to detect the return signal A low energy probe beam can monitor the displacement of the surface of the sample. Scattering-based detection can be used with a dark-field imaging scheme for which different surface topology will result into a different amount of energy contributing to the dark-field image. Also interferometric detection can be used, based on the fact that the (averaged) height of the surface is encoded into the phase of the specularly reflected (coherent) illumination. Additionally it might be possible to measure the change in reflectivity of the surface that is caused by the change in strain inside the material.

Herein below, a plurality of different embodiments of the method of the present invention will be briefly discussed, with reference to the figures. These embodiments include various different implementations of both the application of the acoustic input signal 90 to the sample 26, as well as the detection of the return signal 92. The various embodiments further include methods wherein additional UFM is applied at frequencies wherein tip-sample interaction is governed by local elastic properties, applying additional subsurface imaging at shallow depths up to 150 nanometer below the surface 25.

FIG. 3 schematically illustrates four stages of the measurement process in accordance with one embodiment of the invention. The method of FIG. 3 may for example be applied using a system such as system 20 of FIG. 1 or system 21 of FIG. 2. In FIG. 3, in a first step I a pulsed laser beam 76 is impinged on an absorption layer 85 on the surface 25 of a sample 26. This induces a very high frequency acoustic input signal 90 in the absorption layer 85, as explained above. Dependent on the material and thickness of the absorption layer 85, acoustic input signals of 50 GHz and above may be generated in this manner. For example, a frequency of several hundreds of gigahertz may be generated in this manner. In step II, the acoustic input signal 90 propagates through the sample 26. At the frequencies generated, the signal 90 propagates through the sample across several micrometers, such as to enable visualization of layers of structure 80. In step III, fraction 92 of the signal 90 scatters back towards the surface 25, forming the return signal 92. In step IV, the return signal 92 is detected using a probe 28 by scanning the probe tip 30 across the surface in contact mode, as explained hereinabove for the systems 20 and 21 of FIGS. 1 and 2.

Figure 4:
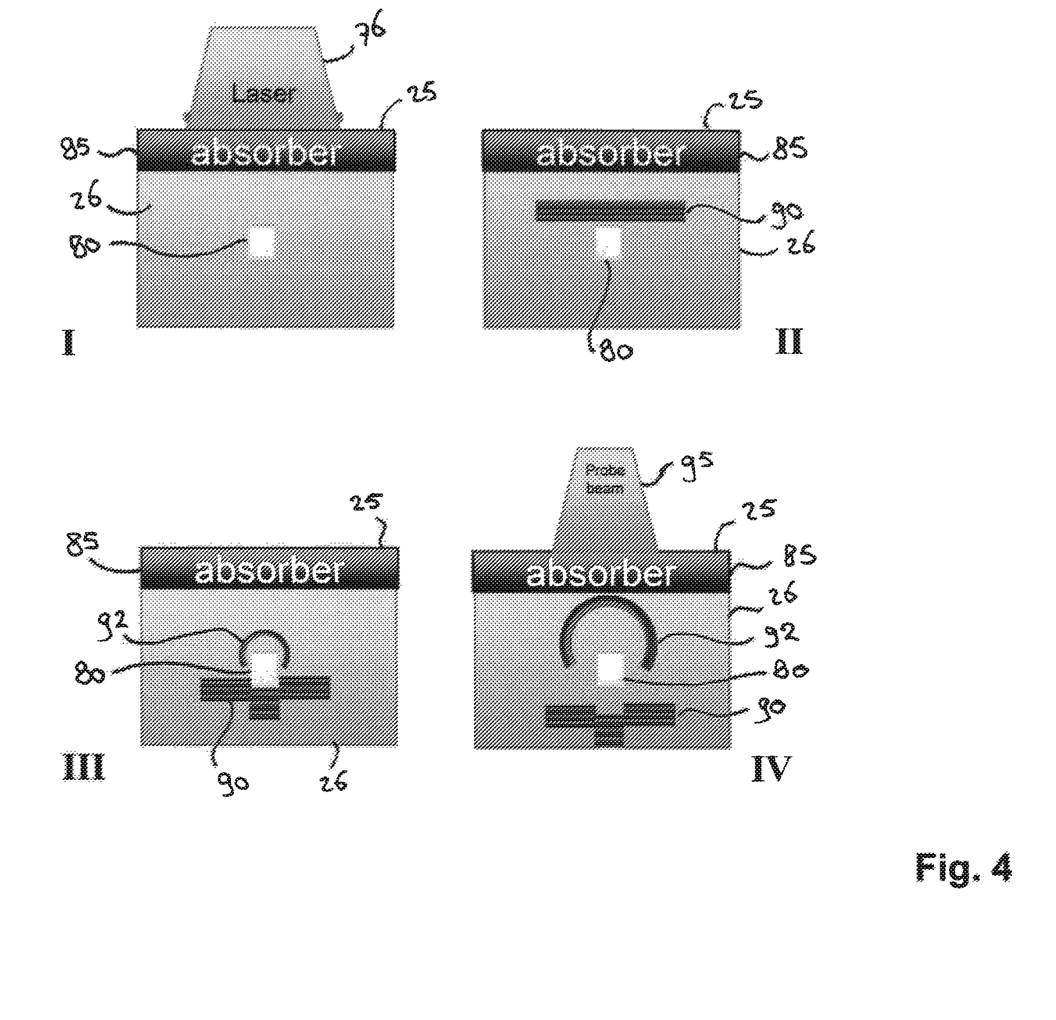
FIG. 4 schematically illustrates a method in accordance with an embodiment of the present invention.

The embodiment illustrated in FIG. 4 is similar to the embodiment of FIG. 3, but instead of the probe 28, in step IV an acoustic photo-thermal probing technique is applied for sensing the return signal 92. This may be implemented using a probing beam 95. The probing beam 95 may be the same beam as laser beam 76 used for photo-thermal stimulation. However, a different probing beam 95 may be applied alternatively. In this embodiment, the use of a probe is not necessary, although in some embodiments application of a probe 28 is used to perform additional UFM at frequencies wherein tip-sample interaction is governed by local elastic properties, applying additional subsurface imaging at shallow depths up to 150 nanometer below the surface 25. This has been described hereinabove.

Figure 5:
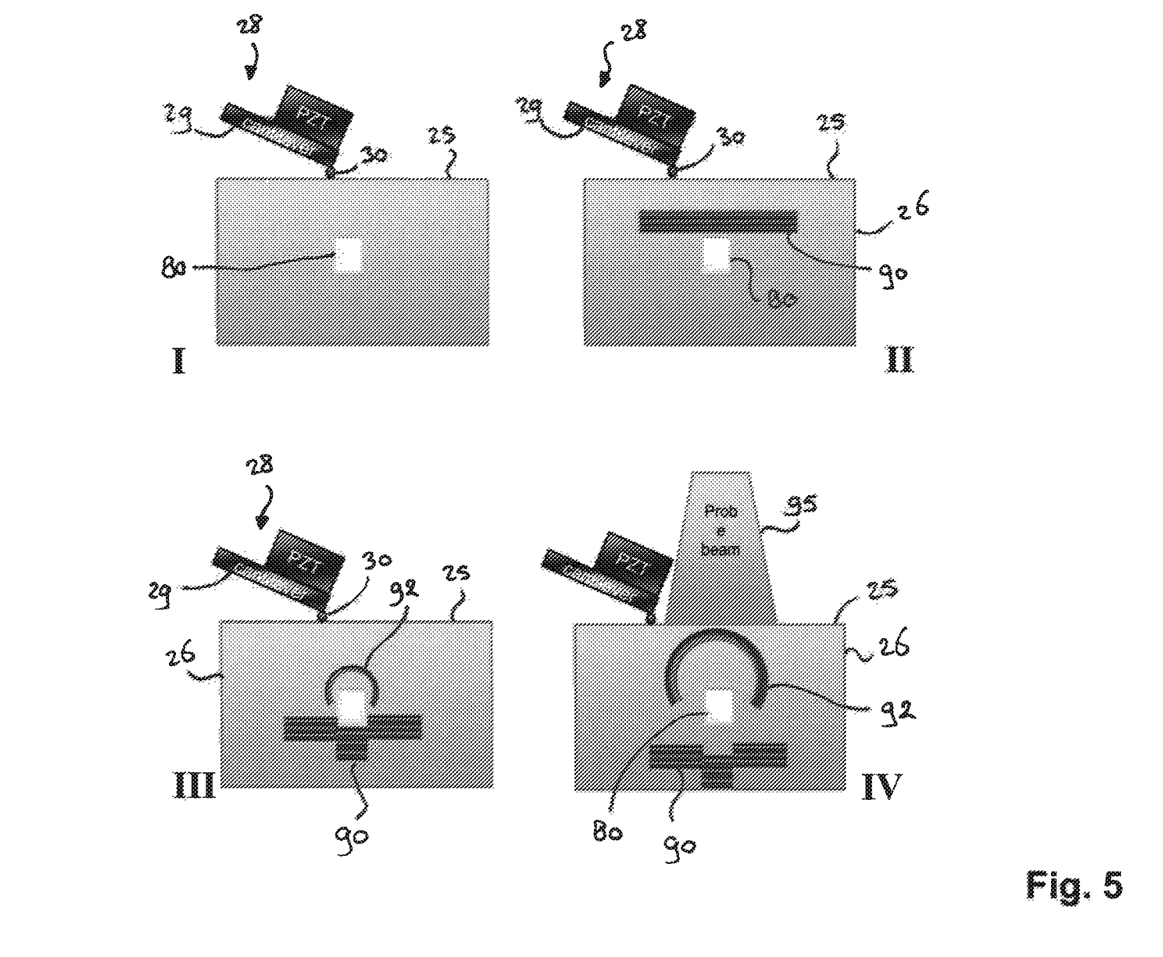
FIG. 5 schematically illustrates a method in accordance with an embodiment of the present invention.

In the embodiment of FIG. 5, steps II and III are again similar to FIGS. 3 and 4. In step I, the acoustic input signal 90 is applied using probe 28 having mounted thereon a piezo transducer 77 on the cantilever 29. Using a piezo transducer such as transducer 77, acoustic input signals of several gigahertz may be achieved. In step IV, sensing of the return signal 92 is performed using a photo-thermal probing beam 95.

Figure 6:
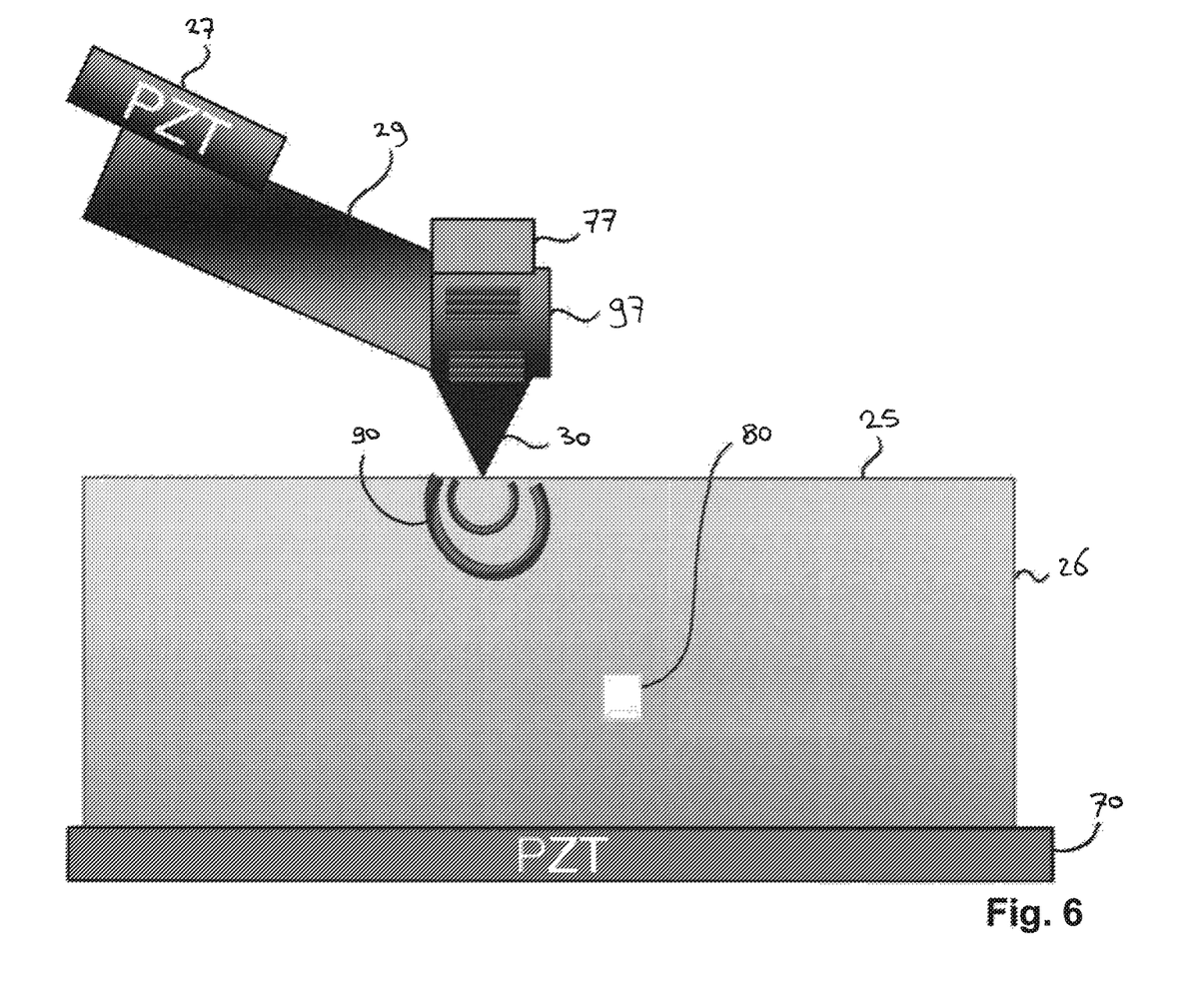
FIG. 6 schematically illustrates a method in accordance with an embodiment of the present invention.

A hybrid method, applying both the very high frequency acoustic input signal 90 of the present invention as well as an addition UFM measurement technique based on creating a Herzian stress field and measuring differences in local elastics (as explained above), is illustrated schematically in FIG. 6. Here transducer 70 underneath the sample 26 applies an ultrasonic signal of up to 100 MHz. Piezo transducer 27 on the cantilever applies an acoustic input signal near the resonance frequency of the probe 28, enabling to detect differences due to shifting of the resonance frequency. The very high frequency acoustic input signal 90 is applied using transducer 77 mounted to the back 97 of the probe tip 30 above the tip 30. The acoustic input signal 90 is applied as a short duration delta pulse, sent into the sample 26 via the surface 25.

Figure 7:
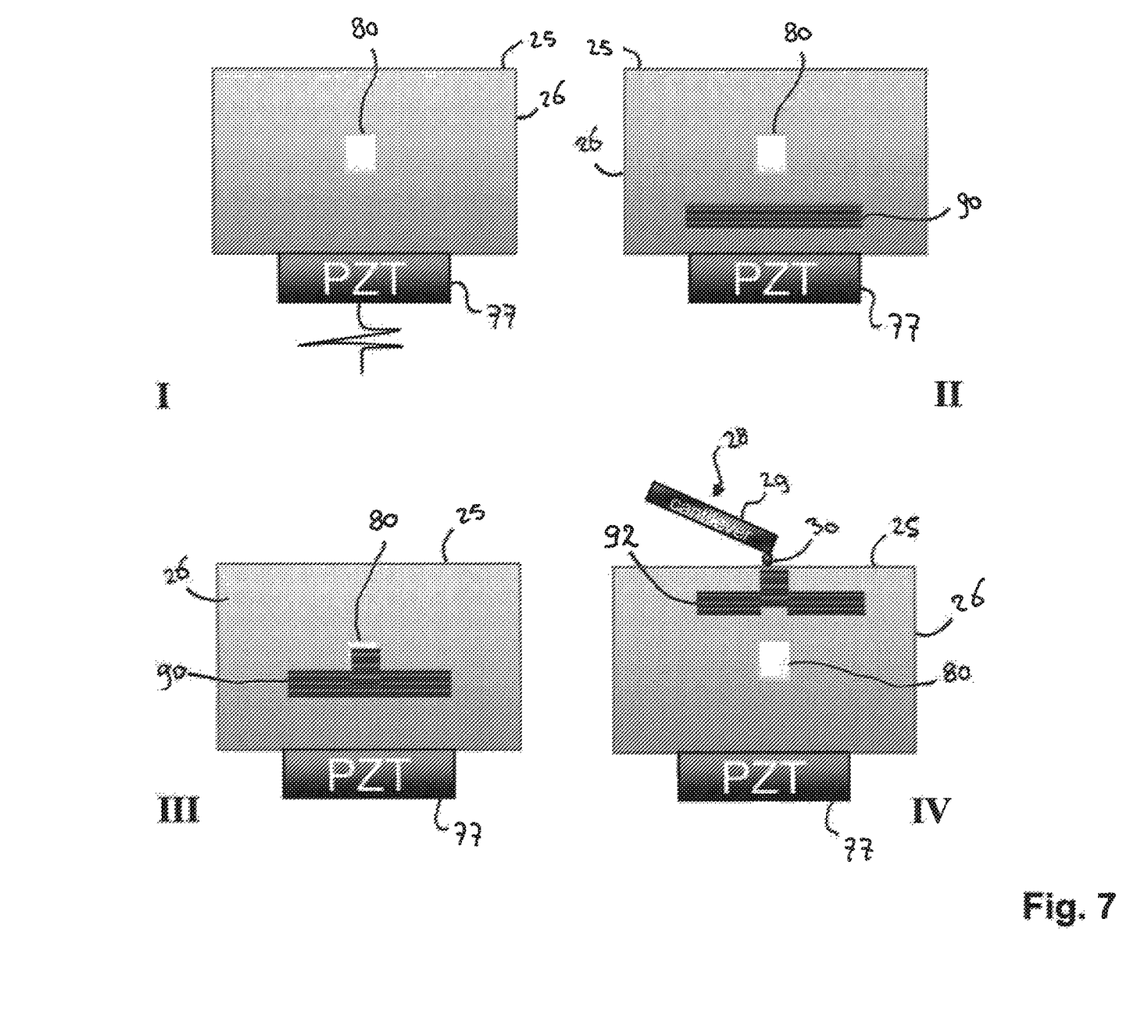
FIG. 7 schematically illustrates a method in accordance with an embodiment of the present invention.

In FIG. 7, yet a further embodiment of the method of the present invention applies a piezo transducer 77 mounted underneath the sample 26, e.g. on a sample carrier. In step I, the very high frequency discontinuous acoustic input signal 90 is applied by piezo transducer 77. In step II, the signal 90 propagates through the sample 26. In step III, a subsurface structure 80 is encountered, consisting of a dense hard material structure having a larger sound velocity than the sound velocity in the surrounding material of the sample (note that if a softer material is encountered, the velocity of sound will be lower instead). This causes the signal 90 to locally advance. In this embodiment, the return signal 92 is considered to be the signal that encounters the surface 25 after propagating through the sample 26. This is illustrated in step IV. The return signal 92 is picked up using probe 28 as described earlier.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of performing subsurface imaging of one or more embedded structures in a substrate underneath a substrate surface using a scanning probe microscopy system, the method comprising the steps of:
    scanning the substrate surface using a probe having a cantilever and a probe tip, the probe tip being in contact with the substrate surface intermittently or continuously;
    applying, using a signal application actuator, an acoustic input signal to the substrate, the acoustic input signal comprising a discontinuous signal of an acoustic signal component, wherein the acoustic signal component has a frequency in a gigahertz range, such that the return signal includes a scattered fraction of the discontinuous signal that is scattered from the embedded structures;
    detecting, using a vibration sensor, after applying the acoustic signal, within a detection depth below the substrate surface, a return signal from the substrate; and
    analyzing the return signal for obtaining information on the one or more embedded structures, for enabling imaging thereof;
    wherein the discontinuous signal is of a controlled limited time duration,
    wherein the method further comprises controlling the controlled limited time duration by a controller such that the controlled limited time duration is shorter than the detection depth divided by a speed of sound within a material of the substrate, such that forward and backward propagation of the discontinuous signal in the sample do not mix, and
    wherein, during applying the acoustic input signal to the substrate, the signal application actuator acts on the at least one of the cantilever or the probe tip for applying the discontinuous signal to the at least one of the cantilever or the probe tip, so as to apply the discontinuous signal to the substrate via the probe tip.

2. The method according to claim 1, wherein the discontinuous signal is a signal taken from the group consisting of:
    a pulse signal;
    a pulse train;
    a signal having a duration shorter than the acoustic travel time in the one or more embedded structures; and
    a signal having a duration shorter than the acoustic travel time through the sample from the surface to one or more of the embedded structures and back.

3. The method according to claim 1, wherein the acoustic input signal is applied by a photo-thermal acoustic stimulation,
    wherein the signal application actuator includes a pulsed laser for impinging a pulse of optical radiation on the substrate,
    wherein a pulse of optical radiation of the pulsed laser has a time-varying intensity,
    wherein the pulse of optical radiation is impinged on a layer of absorbing material on the substrate,
    wherein the absorbing material is arranged for absorbing optical energy of the optical radiation,
    wherein for applying the acoustic input signal including the frequency of the acoustic signal component, a thickness of the layer of absorbing material is inversely proportional to the frequency of the acoustic signal component.

4. The method according to claim 1, wherein the signal application actuator includes at least one of the group consisting of:
    a piezo actuator; and
    an electrostatic actuator mounted on the probe,
    wherein the piezo actuator is suitable for applying the acoustic signal component having a frequency above 1 gigahertz, and
    wherein the piezo actuator is mounted on at least one of the group consisting of:
        the probe tip for conveying the discontinuous signal via the probe tip to the sample surface; and
        a back end of the cantilever, the back end being a remote end of the cantilever with respect to the probe tip, for thereby being used in conveying the acoustic signal via the cantilever to the probe tip and to the substrate surface.

5. The method according to claim 1, wherein the signal application actuator includes a pulsed laser for impinging a pulse of optical radiation on the probe,
    wherein a pulse of optical radiation of the pulsed laser has a time-varying intensity, and
    wherein the pulse of optical radiation is impinged on at least one of the group consisting of:
        the probe tip for conveying the discontinuous signal via the probe tip to the sample surface; and a back end of the cantilever, the back end being a remote end of the cantilever with respect to the probe tip, for thereby being used in conveying the acoustic signal via the cantilever to the probe tip and to the substrate surface.

6. The method according to claim 1, wherein the signal application actuator includes a piezo actuator that applies the acoustic signal component having a frequency above 1 gigahertz,
wherein the acoustic input signal is applied by applying the discontinuous signal via the piezo actuator in contact with at least one of the group consisting of: a side face of the substrate, and a bottom face of the substrate.

7. The method according to claim 1, wherein the detecting of the return signal from the substrate using the vibration sensor comprises monitoring a probe tip motion of the probe tip.

8. The method of claim 7, wherein the vibration sensor is an optical sensor that receives a reflected fraction of a probing laser beam reflecting on the cantilever or probe tip.

9. The method of claim 7, wherein the vibration sensor is an acoustic transducer mounted on the probe tip.

10. The method according to claim 1, wherein the detecting the return signal comprises:
impinging an optical radiation beam onto the substrate, and
receiving a reflected fraction of an optical radiation using an optical sensor for providing a sensor signal,
wherein the reflected fraction is modulated by the return signal, and
wherein the analyzing comprises analyzing at least one of the group consisting of:
a phase of the sensor signal, or
an intensity of the sensor signal.

11. The method according to claim 1, wherein the acoustic signal component has a frequency taken from the group consisting of:
above 1.5 GHZ, and
between 50 gigahertz and 500 gigahertz.

12. The method according to claim 1, wherein the substrate includes an embedded structure that includes a semiconductor device comprising therein a three dimensional NAND type flash memory device.

13. The method according to claim 1, wherein the detecting the return signal from the substrate is performed via the probe tip.

14. A scanning probe microscopy system for performing subsurface imaging of a one or more embedded structures in a substrate underneath a substrate surface, comprising a probe having a cantilever and a probe tip, the probe being mounted on a carrier configured for scanning the substrate surface with the probe tip and for providing intermittent or continuous contact between the probe tip and the substrate surface, the system further comprising:
a signal application actuator that applies an acoustic input signal to the substrate,
a vibration sensor that detects, after the acoustic input signal has been applied, a return signal from the substrate within a detection depth below the substrate surface, and
an analyzer that analyzes the return signal to obtain an information on the one or more embedded structures for enabling an imaging thereof,
wherein the signal application actuator cooperates with a controller for:
providing the acoustic input signal comprising a discontinuous signal of controlled limited time duration of an acoustic signal component,
wherein the controller is configured to control the controlled limited time duration to be shorter than the detection depth divided by a speed of sound within a material of the substrate, such that forward and backward propagation of the discontinuous signal in the sample do not mix, and
wherein the acoustic signal component has a frequency in a gigahertz range; and
wherein the signal application actuator is configured for acting on the at least one of the cantilever or the probe tip for applying the discontinuous signal to the at least one of the cantilever or the probe tip, for applying the acoustic input signal to the substrate via the probe tip.

15. The system according to claim 14, wherein the signal application actuator comprises at least one of the group consisting of:
a pulsed laser for providing a pulse of optical radiation having a time-varying intensity, for applying the acoustic input signal by using a photo-thermal acoustic stimulation; and
a piezo actuator that applies the acoustic signal component having a frequency above 1 gigahertz,
wherein the system is configured to bring the piezo actuator in contact with at least one of the group consisting of: a side face of the substrate, and a bottom face of the substrate.

16. The system according to claim 14, wherein the system comprises at least one of the group consisting of:
the signal application actuator comprising a piezo actuator mounted on the cantilever for applying the discontinuous signal via the probe tip using the piezo actuator; and
the signal application actuator comprising a pulsed laser configured for:
impinging a pulse of optical radiation on the probe, the pulse of optical radiation having a time-varying intensity, and wherein the pulse of optical radiation is impinged on at least one of the probe tip or a back end of the cantilever, the back end being a remote end of the cantilever with respect to the probe tip, or
impinging a pulse of optical radiation on the surface of the substrate, the surface including a layer of absorbing material, wherein the absorbing material absorbs optical energy of the optical radiation,
wherein for applying the acoustic input signal including the frequency of the acoustic signal component, a thickness of the layer of absorbing material is inversely proportional to the frequency of the acoustic signal component.

17. The system according to claim 14,
wherein the sensor for detecting the return signal includes an optical sensor receiving a reflected fraction of a laser beam reflecting on the cantilever or probe tip for monitoring probe tip motion; or
wherein the system includes a laser for impinging an optical radiation beam onto the substrate, and an optical sensor for receiving a reflected fraction of optical radiation for providing a sensor signal.

18. The system according to claim 14, wherein the discontinuous signal is a signal taken from the group consisting of:
a pulse signal;
a pulse train;

a signal having a duration shorter than the acoustic travel time in the one or more embedded structures; and a signal having a duration shorter than the acoustic travel time through the sample from the surface to one or more of the embedded structures and back.

19. The system according to claim 14, wherein the system is configured to detect the return signal from the substrate via the probe tip.

* * * * *